UNITED STATES PATENT OFFICE.

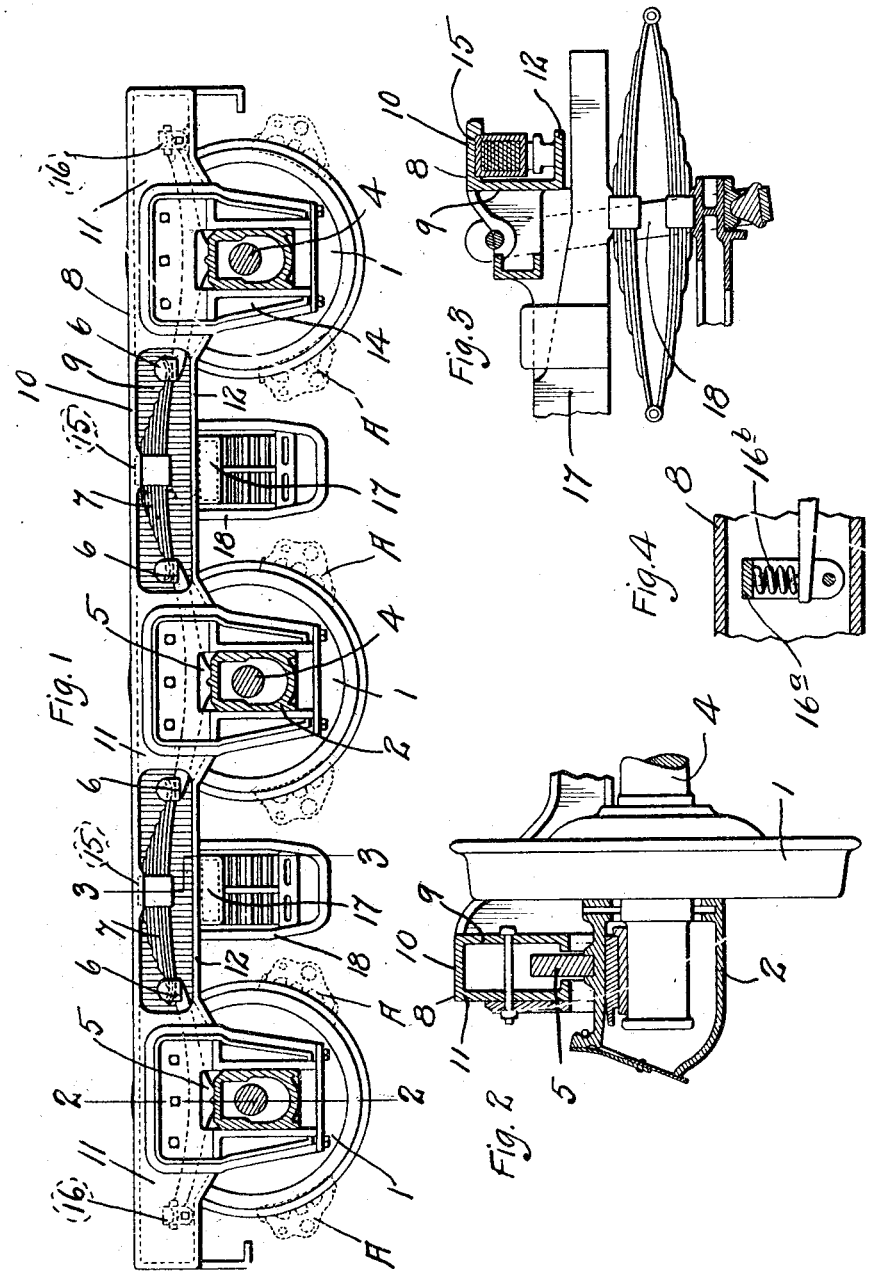

CLARENCE H. HOWARD AND HARRY M. PFLAGER, OF ST. LOUIS, MISSOURI, ASSIGNORS TO DOUBLE BODY BOLSTER COMPANY, OF ST. LOUIS, MISSOURI, A CORPORATION OF NEW JERSEY.

TRUCK CONSTRUCTION.

1,080,556.   Specification of Letters Patent.   Patented Dec. 9, 1913.

Application filed November 25, 1912. Serial No. 733,413.

*To all whom it may concern:*

Be it known that we, CLARENCE H. HOWARD and HARRY M. PFLAGER, citizens of the United States, residing at St. Louis, Missouri, have invented a certain new and useful Improvement in Truck Construction, of which the following is a full, clear, and exact description, such as will enable others skilled in the art to which it appertains to make and use the same, reference being had to the accompanying drawings, forming part of this specification, in which—

Figure 1 is a side elevation partly in section illustrating our improved truck construction. Fig. 2 is a detail in section on line 2—2 of Fig. 1. Fig. 3 is a detail in section on line 3—3 of Fig. 1. Fig. 4 is a detail sectional view showing a modified construction of connecting the ends of the equalizing bars at the extremities of the wheel pieces of the truck.

Our invention relates broadly to truck constructions and specifically to a new and improved construction and arrangement of the truck frame and the equalizing members of the truck, and this application should be read in connection with an application filed by us November 18th, 1912, Serial No. 732,099.

Our invention has for its principal object the production of a form of truck wherein the equalizing bars are disposed in positions where they will not interfere with the inspection and repair of other portions of the truck or of the truck equipment.

Further objects of our invention are to materially increase the strength of the truck construction and decrease the weight thereof, to increase the flexibility of the truck, to produce an improved means for equalizing the distribution of weight among all of the wheels of the truck and to dispose the equalizing members wholly above the journal boxes of the truck and yet keep within the limited space between the tops of the track rails and the top of the truck frame.

In the form of trucks for railway cars now most commonly in use the wheels are provided with journal boxes upon which are carried equalizing bars disposed in series between the wheels longitudinally of the truck, each equalizing bar being supported at each of its ends upon a different journal box. Between the wheels, the equalizing bars are formed with a depending portion upon which are seated heavy coil springs which support the truck frame. As the equalizing bars extend from journal box to journal box and carry the weight of the truck frame and the car, they must possess great strength, and consequently are of considerable size and weight.

As disposed in trucks now most commonly in use, the depending portions of the equalizing bars and the springs carried thereby occupy positions in front of the brake heads and other portions of the brake rigging. Because of this fact, thorough inspection of the brake heads is difficult, and access to them for making repairs is very limited. In our improved truck construction, we overcome these difficulties by altering the form of the equalizing bars, and supporting each one upon a separate journal box in a position above the brake beams and other depending portions of the truck equipment. Because of this novel arrangement, we are enabled also to decrease very materially the size and weight of the equalizing bars. We are enabled to use also half elliptical springs for supporting the truck frame, which springs are supported at their ends upon different equalizing bars. These springs are positioned entirely above the brake heads and above the journal boxes. To accommodate the equalizing bars and the springs in these positions, we form the truck side frames of hollow members within which the equalizing bars and the springs are contained. By virtue of this construction, therefore, we obtain not only a much more compact structure, but also one in which the equalizing bars and the springs are effectively protected from injury. By virtue of their being contained within the hollow side frames the equalizing bars, if broken will be contained in the frame so that they will not fall out and possibly cause derailment of the car.

For the purpose of illustrating our invention, we have shown it applied to a six-wheel truck equipped with brakes on both sides of the wheels 1. The journal boxes 2 are carried upon the axles 4 in the usual fashion. The equalizing bars are designated by 5, each being fulcrumed upon one of the journal boxes 2. At their ends the equalizing bars are formed with spring seats 6 upon which are supported half-elliptical springs 7, each spring being disposed so that it is supported at each of its ends upon a different equalizing bar. The side frames or wheel pieces 8 of the truck are preferably cast in the form of hollow members having an inner wall 9, a top wall 10, a front wall 11, and a bottom wall 12. The wheel pieces carry the pedestals which embrace the sides of the journal boxes in the usual manner. Seats 13 are provided on the side frame intermediate the pedestals for the reception of the springs 7, and in the portions intermediate the pedestals, portions of the front wall 11 of the wheel piece are cut away to permit the insertion and inspection of the springs. Over the journal boxes, portions of the bottom wall 12 are cut away, as illustrated in Fig. 2, and through these cut away portions parts of the equalizing bars project to engage the journal boxes. The outer ends of the equalizing bars at the extremities of the wheel pieces are engaged by links 16 pivoted to the truck frame.

In Fig. 4, we have shown a modified arrangement of connecting the ends of the equalizing bars to the wheel pieces at the extremities thereof which modified arrangement includes a link 16ª, preferably of inverted U-shape pivoted at its lower end and interposed between the top of said link and the end of the equalizing bar is a comparatively stiff compression spring 16ᵇ. Where such construction is utilized, the ends of the equalizing bars coöperate with springs, thereby materially increasing the flexibility of the truck frame support. The springs 7 are supported in series upon the adjacent ends of juxtaposed equalizing bars, and the truck frame is supported upon the springs. The truck bolsters 17 are suspended from the truck frame by the hangers 18 and depend below the springs and the equalizing bars. It will be seen that in this construction, the equalizing bars are contained within the hollow side frames or wheel pieces of the truck, being positioned within the horizontal plane of the truck frame and entirely removed from the brake heads illustrated at A. This leaves the brake heads and other portions of the brake rigging below the truck frame entirely open to inspection or repairs, and the equalizing members, while occupying sheltered positions, are at the same time easily accessible for inspection and repair. The springs form a flexible mounting between the equalizing bars and the truck frame, and they, together with the fulcrumed equalizing bars, respond to any change in elevation of any of the wheels relative to the others so as to compensate therefor and at the same time maintain an equal distribution of weight among all of the wheels.

In the construction of the truck disclosed in the application hereinbefore referred to, the equalizer springs were shown and described as resting directly on the journal boxes and the rigid equalizer bars were disclosed as bearing upon the upper flanges of the wheel pieces, and it will be noted that in the present application, the arrangement of the equalizing members is reversed, that is, the rigid members bear directly upon the journal boxes, while the springs bear upon the top flange of the wheel piece. In the present construction, we have shown the wheel piece formed in a single casting integral with the transverse parts of the truck frame, but it is obvious that our improved arrangement of equalizing members can be advantageously used in connection with a built-up truck frame or with a frame having built-up wheel pieces.

While we have described in the foregoing a single specific construction embodying our invention, it is not our intention that our invention hereinafter claimed be limited to that particular form, for we are aware that various changes and modifications may be made without departing from the spirit of our invention. Therefore, we intend that the construction to be placed upon our invention be of sufficient scope to comprehend all obvious changes and modifications in which the principles of our invention are employed.

We claim:

1. In a truck construction, the combination with a series of wheel carrying axles and journal boxes, of an equalizing bar supported by each journal box, springs supported by the equalizing bars and a truck frame supported by said equalizing bars and springs the wheel pieces of which truck frame are hollow and contain the equalizing bars and springs.

2. In a truck construction, the combination with a series of wheel carrying axles and journal boxes, of equalizing bars fulcrumed upon the journal boxes, a truck frame having wheel pieces lying wholly above the axles and journal boxes, and springs interposed between the ends of said equalizing bars and said truck frame which equalizing bars and springs are positioned within said wheel pieces.

3. In a truck construction, the combination with a series of wheel carrying axles and journal boxes, of equalizing bars fulcrumed on the journal boxes, springs supported by the equalizing bars a truck frame supported by said springs and equalizing bars, wheel pieces on said truck frame which wheel pieces are hollow and lie wholly above the truck axles and journal boxes, which equalizing bars and springs are contained within the wheel pieces of the truck frame.

4. In a truck construction, a series of wheel carrying axles, journal boxes therefor, equalizing bars supported on the journal boxes, flexible connections between the equalizing bars, and a truck frame supported by said flexible connections and equalizing bars the wheel pieces of which truck frame are hollow and contain the equalizing bars and flexible connections.

5. In a truck construction, the combination with a series of wheel carrying axles and journal boxes, of an equalizing bar supported by each journal box, a truck frame flexibly carried by said equalizing bars and tubular wheel pieces for said truck frame, which wheel pieces are positioned above the car axles and journal boxes and contain the equalizing bars.

6. In a truck construction, the combination with a series of wheel carrying axles and journal boxes, of an equalizing bar supported by each journal box, springs supported by the equalizing bars, a truck frame supported by said springs and tubular wheel pieces for said truck frame, which wheel pieces lie wholly above the axles and journal boxes and contain the equalizing bars and springs.

7. In a truck construction, the combination with a series of wheel carrying axles and journal boxes, of equalizing bars supported by the journal boxes, springs supported by the equalizing bars, and a truck frame supported by said springs and provided with substantially hollow wheel pieces lying wholly above the axles and journal boxes, which equalizer bars and springs are contained within said substantially hollow wheel pieces.

8. In a truck construction, the combination with a series of wheel carrying axles and journal boxes, of equalizing bars supported by the journal boxes, springs supported by the equalizing bars, and a truck frame supported by said springs and lying wholly above the truck axles and journal boxes, which equalizing bars and springs are contained within the wheel pieces of the truck frame.

9. In a truck construction, the combination with a series of wheel carrying axles and journal boxes, of a truck frame having substantially hollow wheel pieces which lie wholly above the axles and journal boxes, and a series of alternately arranged equalizing bars and equalizing springs disposed within the hollow wheel pieces and cooperating with each other to yieldingly support the truck upon the journal boxes said equalizing bars being supported by the journal boxes.

10. In a truck construction, a series of wheel carrying axles, journal boxes therefor, a truck frame having tubular wheel pieces equalizing bars supported on the journal boxes, and leaf springs between said equalizing bars which equalizing bars and leaf springs are located wholly within the tubular wheel pieces of the truck frame.

11. In a truck construction, a series of wheel carrying axles, journal boxes therefor, a truck frame having tubular wheel pieces equalizing bars supported on the journal boxes, leaf springs between said equalizing bars, which equalizing bars and leaf springs are located within the tubular wheel pieces of the truck frame and said wheel pieces and contained parts being located wholly above the axles and journal boxes.

12. In a truck construction, a series of wheel carrying axles, journal boxes therefor, equalizing bars supported by the journal boxes, a truck frame having substantially tubular wheel pieces which contain the equalizing bars and leaf springs arranged within the tubular wheel pieces of the truck frame and engaging the equalizing bars.

13. In a truck construction, a series of wheel carrying axles, journal boxes, equalizing bars supported thereon, a truck frame lying wholly above the axles and journal boxes, flexible members supported by the equalizing bars, which flexible members and equalizing bars are disposed within parts of the truck frame and yieldingly support the same.

14. In car truck construction, a wheel carrying axle, a journal box therefor, a member fulcrumed on the journal box, a frame, tubular wheel pieces forming a part of said frame, and flexible members coöperating with the extremities of the fulcrumed member for supporting the frame, which flexible members and fulcrumed member occupy the tubular wheel pieces of the truck frame.

15. In a truck construction, a series of wheel carrying axles, journal boxes, a frame having a tubular wheel piece lying wholly above the journal boxes, a flexible member bearing upon the frame, and separate means operatively connecting each end of said flexible member with different journal boxes which flexible member and means connected to the ends thereof are located wholly within the tubular wheel piece of the frame.

16. In a truck construction, a series of wheel carrying axles, a frame having a tubular wheel piece located wholly above the axles, a spring bearing upon said frame, and independently movable members supported upon different journal boxes and coöperating with the spring for yieldingly supporting the frame which spring and independently movable members are contained within the tubular wheel piece of the frame.

17. In a truck construction, a series of wheel carrying axles, journal boxes therefor, an equalizing bar mounted on each journal box and disposed above the brake beams of the trucks, a truck frame having tubular wheel pieces located wholly above the axles and journal boxes, and means for supporting said frame upon the equalizing bars, said means being disposed above the brake beams said last mentioned means and the equalizing bars being located within the tubular wheel pieces of the truck frame.

18. In a truck construction, a frame having tubular wheel pieces, a series of wheel carrying axles, journal boxes therefor, bolsters suspended from the frame between the wheels, equalizing bars supported by the journal boxes, and frame supporting springs supported by said equalizing bars, said springs being disposed above the bolsters which equalizing bars and springs are located wholly within the tubular wheel pieces of the frame.

19. In a truck construction, a series of wheel carrying axles, journal boxes therefor, a frame having tubular wheel pieces, equalizing bars supported by the journal boxes, and flexible means substantially in longitudinal alinement with the equalizing bars for yieldingly supporting the truck frame which equalizing bars and flexible means are located wholly within the tubular wheel pieces of the truck frame.

20. In a car truck having the usual wheel-carrying axles and journal boxes, a truck frame lying wholly above the axles and journal boxes and having substantially hollow wheel pieces, rigid equalizing members mounted on the journal boxes and arranged substantially within the hollow pieces of the truck frame, and flexible equalizing members between said rigid equalizing members.

21. In a car truck provided with the usual wheel carrying axles and journal boxes, a truck frame lying wholly above the axles and journal boxes and having flanged wheel pieces, rigid equalizing members mounted upon the journal boxes and arranged between the flanges of the wheel pieces, and flexible equalizing members between the rigid equalizing members.

22. In a car truck having the usual wheel carrying axles and journal boxes, a truck frame lying wholly above the axles and journal boxes and having substantially channel shaped wheel pieces, and coöperating rigid equalizing members and flexible equalizing members located substantially within said channel shaped wheel pieces, which rigid equalizing members bear upon the journal boxes of the truck.

In testimony whereof we hereunto affix our signatures in the presence of two witnesses, this 19th day of November, 1912.

CLARENCE H. HOWARD.
HARRY M. PFLAGER.

Witnesses:
 CHAS. S. SHALLENBERGER,
 HAL C. BELLVILLE.